Jan. 30, 1945.   E. D. COOK   2,368,449
EXPANDER CIRCUIT FOR OSCILLOSCOPES
Filed Aug. 3, 1940
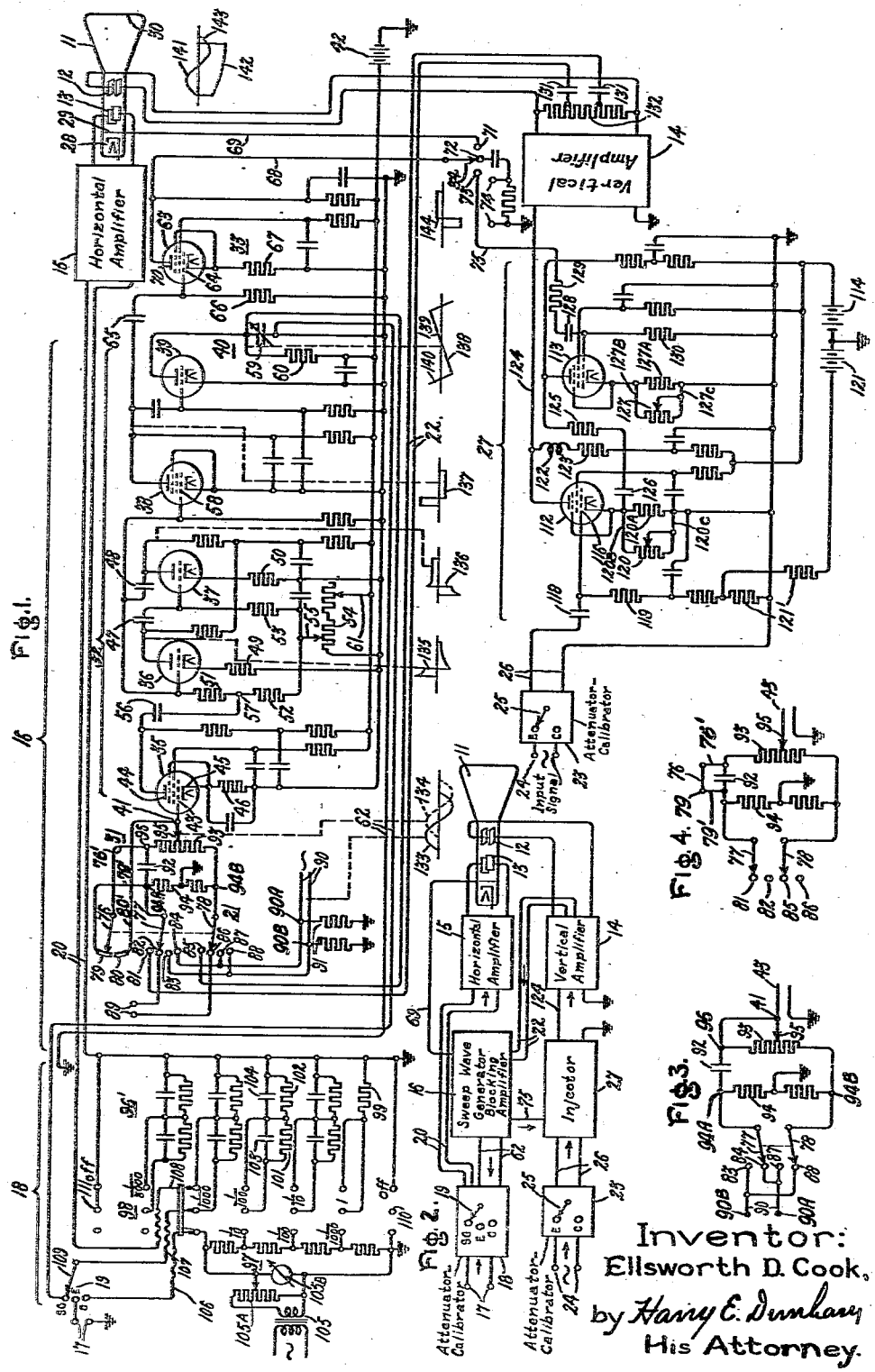
Inventor:
Ellsworth D. Cook,
by Harry E. Dunham
His Attorney.

Patented Jan. 30, 1945

2,368,449

UNITED STATES PATENT OFFICE 2,368,449

EXPANDER CIRCUIT FOR OSCILLOSCOPES

Ellsworth D. Cook, Scotia, N. Y., assignor to General Electric Company, a corporation of New York Application August 3, 1940, Serial No. 350,288

16 Claims. (Cl. 171—95)

This application is a continuation-in-part of my copending application Serial Number 338,360, filed June 1, 1940, and assigned to the same assignee as the present application. As to those features not disclosed in my said parent application the present application relates to improvements in the apparatus disclosed in the copending application of Harris A. Thompson, Serial Number 350,409, filed August 3, 1940, and also assigned to the same assignee as the present application.

My invention relates to oscilloscopes and concerns particularly oscilloscopes of the type having a signal-tracing beam, such as cathode ray oscilloscopes, with means for deflecting the beam in a given plane in response to a signal wave to be examined in the oscilloscope and for deflecting the beam in a transverse plane in response to a time-axis or sweep wave.

One of the objects of my invention is to provide improved methods and apparatus for expanding on the screen of the oscilloscope, an image of a portion of the signal wave to be observed.

Other objects include providing a simplified arrangement for making the sweep wave synchronous with the signal wave, providing improvements in sweep-wave generator circuits, providing an improved arrangement for offsetting the expanded portion of the signal wave from the remainder of the signal wave, providing a simple single control for alternatively selecting the portion of the signal wave to be expanded or producing the wave without expansion and adjusting the strength of the synchronizing voltage, providing an attenuation arrangement for calibrating the axes of the wave produced on the oscillograph screen, and providing an accurate arrangement for changing the scale range along either axis. Other and further objects and advantages will become apparent as the description proceeds.

In carrying out the invention in its preferred form, a cathode ray oscilloscope is provided with a sweep-wave generator, a blanking amplifier for blanking the cathode ray beam during the return sweep when desired, an injector amplifier for offsetting the expanded portion of the signal wave on the oscilloscope screen and a pair of adjustable attenuation circuits for adapting the sweep and signal circuits of the apparatus to various ranges of input amplitude. Change-over switches, adjustments and controls are provided to adapt the oscilloscope to various types of circuit testing and visual wave examination with or without expansion of a portion of the wave to be examined and with high fidelity over a high range of frequencies, such as encountered in radio television circuits, for example. In testing television apparatus, an oscilloscope is required which will faithfully represent complex wave shapes and it is desirable to this end that the frequency range of the circuits extend from about ten cycles per second to four megacycles per second with a phase shift of not more than ten degrees at the lower frequency limit. The range of frequencies through which the horizontal sweep wave generator can be adjusted to operate should extend from ten cycles per second to about one hundred kilocycles per second.

For a more complete understanding of the invention, reference may be had to the following detailed description and the accompanying drawing. The features of the invention which are believed to be novel and patentable, other than those claimed in the aforesaid parent application Serial No. 338,360 are pointed out in the claims appended hereto. In the drawing, Fig. 1 is a circuit diagram of one embodiment of my invention, Fig. 2 is a simplified block diagram of the circuit of Fig. 1, and Figs. 3 and 4 are simplified fragmentary circuit diagrams of a portion of the circuit of Fig. 1 for two different positions of the change-over switch for operating the apparatus with or without expansion of a portion of the signal wave to be examined. Like reference numerals are utilized throughout the drawing to designate like parts. I have also shown seven unnumbered figures of voltage wave shapes at different points in the system. These figures are conveniently identified by the reference characters of the waves shown as 133, 135, 136, 137, 138, and 141.

For the sake of illustration, I have shown and described an arrangement for use with an oscilloscope tube 11 of the electrostatic deflection type having two pairs of deflection plates 12 and 13, the former for producing vertical deflection of the beam in response to variations in the intensity of the signal to be examined and the latter for producing horizontal deflection or sweeping the beam to provide a time axis. Vertical and horizontal amplifiers 14 and 15, respectively, represented by rectangles, are provided for amplifying the signal and the sweep wave to produce voltages of sufficient magnitude for application to the deflection plates. In oscilloscopes for wide frequency ranges, an electrostatic-deflection-type tube is preferable but my invention is not limited thereto. It will be understood that if an oscilloscope tube having magnetic deflection coils is to be used, the amplifiers 14 and 15 will be such as to produce current waves of the wave form corresponding to the signal wave and the desired sweep wave instead of voltage waves, and in certain portions of the following description references to voltage waves should be understood as meaning current waves for oscilloscopes with deflection coils. These amplifiers, however, are of conventional design and do not form a part of my invention.

For producing a suitable voltage wave to sweep the beam parallel to the time axis, a sweep wave generator is provided which is included in apparatus represented by the rectangle 16 in Fig. 2. This apparatus has incorporated in it, a blocking amplifier for cutting off the return sweep of the beam at will when there is to be no expansion of the signal wave. The arrangement of the apparatus is such that a sweep wave externally supplied at terminals 17 may also be utilized, and to allow for possible variations in maximum amplitude of such external sweep waves an adjustable ratio attenuator 18 is provided. The latter may be combined with a calibration comparator and contains a three-position switch 19 for causing a sweep-voltage wave to be applied to the horizontal amplifier through conductors 20 from the sweep wave generator in the unit 16, from the external sweep terminals 17, or from a calibration circuit. The apparatus 16 which includes the sweep wave generator contains also a change-over switch 21 (shown in Fig. 1 but not shown in Fig. 2) for causing the sweep wave either to be synchronized directly with the signal wave by a component thereof drawn from the vertical amplifier 14 through conductors 22 or to be synchronized with an A. C. power source. These features will be described more in detail hereinafter.

An adjustable ratio attenuator and calibration comparator 23 may also be provided for the vertical amplifier. It includes input terminals 24, to which is applied a signal wave to be examined, and a change-over switch 25 for causing either the signal wave or a calibration voltage to be applied to the input of the vertical amplifier through conductors 26. It is otherwise similar to the horizontal attenuator and compensator 18. If it is desired to offset the expanded portion of the signal wave, a rectangular wave injector 27 may be interposed between the attenuation comparator 23 and the vertical amplifier 14, as will be described more in detail hereinafter.

The oscilloscope tube 11 is of conventional type having in addition to the deflection plates already mentioned, a cathode 28, a control electrode or grid 29, one or more anodes (not shown), necessary coupling elements and control circuits (also not shown) and a fluorescent screen 30 on which an image of a signal wave to be examined is produced.

The sweep-wave generator, the injector and the amplifiers are circuits employing electronic discharge devices such as vacuum tubes. In the arrangement illustrated the vacuum tube circuits are impedance coupled and employ both triodes and pentodes, but my invention is not limited to the specific arrangements shown.

The apparatus previously designated collectively by the reference numeral 16, is shown more in detail in Fig. 1 and includes the change-over switch 21, a rheostat-condenser circuit 31 which functions either as phase-shifter or volume control according to the position of the switch 21, the actual sweep-wave generator circuit 32, a blanking amplifier 33, and a rectangular-wave output control switch 34 (Fig. 1). The sweep-wave generator 32 comprises successive vacuum tube stages represented by a synchronizing amplifier or isolation tube 35, multivibrator tubes 36 and 37, clipper tubes 38 and 39 and a saw-tooth wave-producing or integrating circuit 40.

As will be explained more in detail hereinafter, synchronizing voltage for the sweep wave generator 32 may be supplied from any one of three different sources to an input terminal 41. There is a source of anode voltage 42 and there are suitable sources of heater current (not shown). The synchronizing amplifier or isolation tube 35 is shown as of the pentode type, an 1852 tube for example, including a control electrode or grid 43, connected to the generator input terminal 41, an anode 44 and a cathode 45 with a self-biasing or stabilizing resistor 46 in the cathode circuit.

The multivibrator tubes 36 and 37 have their grids and anodes cross-coupled through coupling condensers 47 and 48, for transferring the conduction cycle back and forth between the tubes in accordance with the generally stated theory of operation of multivibrators. Stabilizing resistors 49 and 50 are shown in the cathode leads, which I have found to be an aid in limiting peak currents drawn by these tubes. A grid-leak resistor consisting of resistors 51 and 52 in series is provided for the tube 36 and a grid-leak resistor 53 is provided for the tube 37, the ratio between resistances of 51 plus 52, and 53 being so chosen as to give the desired pulse width ratio and to make the tube 36 the short-pulse stage by making its grid-leak resistance 51 plus 52 less than 53. For adjusting the fundamental frequency of the multivibrator, a potentiometer 54 is provided connected across the plate source 42. The potentiometer 54 has an adjustable voltage tap 55 to which the grid-leak resistors are connected and which serves as the frequency adjustment. It is to be observed that the tap 55 is at positive potential for any adjustment of the potentiometer 54. I have found that resistors 49 and 50 must not have too great values if the frequency is not to be greatly depressed before it is again smoothly increased as a smoothly increasing positive potential is applied to the grid leak resistors 51 plus 52 and 53 by potentiometer tap 55.

In order that the plate loading resistance of the isolation tube 35 may be sufficient for adequate gain without permitting the resistance of tube 35 to become such an important part of the total resistance in the grid circuit of the first multivibrator tube 36 as to influence the frequency, the A. C. plate loading resistance has been placed at the low potential end of the grid discharge circuit of the first multi-vibrator tube 36. This is accomplished by connecting a coupling condenser 56 between the anode 44 of the isolation tube 35 and the common terminal 57 of the grid-leak resistors 51 and 52 and making resistor 51 larger than 52 in value. The synchronizing voltage is applied to the short-pulse stage 36 for improving the stability by more definitely fixing the time at which conduction is permitted. The terminal 57 thus serves as a sweep-wave-generator input terminal for receiving synchronizing voltage.

It was found that the input capacity across the grid of each multivibrator stage could not be permitted to be very large, since the condenser reactance at the fundamental frequency for that stage would become comparable to the grid-leak resistance across which it would appear and rectangular wave shapes would then no longer be obtainable. In other words, the high frequency attenuation during the amplifying interval of that stage of the multivibrator would seriously impair the wave shape. Accordingly triodes with relatively low amplification constants, such as 6C5 tubes were used as the multivibrators 36 and 37.

The final multivibrator stage 37 is the long-pulse stage, i. e., its anode voltage is positive for a relatively long period and during this period its anode current is practically cut off. The constants of the circuits are made such that the grid voltage applied to the tube 37 by the previous stage exceeds cut-off and the final stage comprising the tube 37 operates from cut-off of plate current to conduction during the condenser discharge cycle for the long duration pulse. A single clipper stage, removing the peak of the conduction cycle, which occurs during the short pulse in the final multivibrator stage, would be sufficient to provide a rectangular wave shape if the clipping action were applied to the voltage developed across the cathode resistor 50 where the voltage developed is due to the conduction current of tube 37 across a resistor only. However, in order to raise the level of the eventual triangular wave 138 developed from this rectangular wave above the order of noise and inevitable transients it has been found desirable to clip the voltage developed at the anode of tube 37 which results in a small tip at the start of the long pulse in the voltage wave 136. In order to square the long pulse further, what is effectively a two-stage clipper is employed.

For providing large steps in a wide frequency range, suitable switches, not shown, may be provided for switching in different values of capacity for the condensers 47 and 48 to cover successive frequency ranges. For vernier adjustment of frequency at each step, the tap 55 of the potentiometer 54 is provided, and for fine vernier adjustment the tap 61 is provided. My invention is not, of course, limited to the use of any particular constants in the multivibrator circuit. However, I obtain satisfactory results with 6C5 tubes as the tubes 36 and 37, using the following values:

| For the resistor— | Ohms |
| --- | --- |
| 51 | 200,000 |
| 52 | 10,000 |
| 49 | 100 |
| 50 | 2,000 |
| 53 | 1,000,000 |
| For the separate anode resistors of the tubes 36 and 37 | 5,000 |
| For the portion of the potentiometer 54 traversed by the tap 55 | 200,000 |
| For the portion traversed by the tap 61 | 10,000 |

And for the condensers 47 and 48:
 .1 microfarad in the 10–35 cycle range
 .02 microfarad in the 35–150 cycle range
 .006 microfarad in the 150–900 cycle range
 .001 microfarad in the 900–4500 cycle range
 .00015 microfarad in the 4500–20,000 cycle range
 .00005 microfarad in the 20,000 to 1,000,000 cycle range The clipper circuit is shown as comprising a pentode 38 such as a 6SJ7 tube, and a triode 39 such as 6J5 tube, for example, with constants so chosen as to drive the grid voltages of these tubes past cut-off alternately. They are shown without self-biasing or stabilizing resistors in the cathode leads. In order to obtain the requisite voltages for driving the grids past cut-off, the existing coupling or feed-back condenser 48 and resistor 51, 52 of the first multivibrator stage 36 are used as the coupling circuit for the first clipper stage, by connecting the grid 58 of the tube 38 to that of the tube 36, which essentially has the same voltage as developed by the plate of tube 37.

For converting the rectangular wave to a triangular wave or saw-tooth voltage, the saw-tooth discharge circuit 40 is employed. For the sake of obtaining the maximum possible amplitude of the saw-tooth wave, the discharge circuit 40 utilizes a condenser 59 shunted across the anode and cathode of the tube 39 and the D. C. feed anode resistor 60 of the tube 39, the resistor 60 having a relatively large resistance in relation to the capacity of the condenser 59. In order to keep the amplitude of the saw tooth voltage substantially constant over the entire sweep frequency range, the condenser 59 may be made variable and ganged with the frequency-controlling potentiometer tap 55 and, if desired, an additional control may be ganged also with the additional frequency control tap 61 which is used as a fine vernier frequency control by adjusting the current supply to the potentiometer 54. Conductors 62 connected across the condenser 59 are provided for taking off the saw-tooth sweep voltage and passing it through the attenuator 18 and the conductors 20 to the horizontal amplifier 15.

For obtaining a rectangular wave voltage of sufficient amplitude to optionally blank out the return time of the oscilloscope tube when sectional expansion is not desired, the blanking amplifier 33 is employed. It may comprise a vacuum tube 63 of the pentode type such as a 6SJ7, for example, which is designed to be operated as a "clipper" stage since its only useful output is a square wave. In order that short negative pulses will be supplied, the tube 63 is fed from a source of short positive pulse rectangular voltage such as the anode of the clipper tube 38. As illustrated the grid 64 of the tube 63 is coupled by a condenser 65 and grid leak 66 to the anode of the tube 38. For avoiding loading the saw-tooth creating circuit 59 and 60, the impedance of the input circuit of tube 63 has been kept large. To avoid loss of wave shape at the lowest fundamental sweep frequencies employed, the time constant of the coupling circuit is kept sufficiently large. Conductors 68 and 69 are provided for connecting the anode or output terminal 70 of the blanking amplifier to the control grid 29 of the oscilloscope tube 11.

To permit utilizing the rectangular wave output of the amplifier 33 for other purposes and disconnecting from the oscilloscope grid 29 when sectional expansion of the input signal wave is desired, the switch 34 is provided. It comprises three stationary contacts 71, 72 and 73 to any one of which the conductor 68 may be connected. The contact 71 is connected to the conductor 69, the contact 72 is capacitatively coupled to a pair of output terminals 74, and the contact 73 is connected to a conductor 75 for supplying a rectangular wave to the injector tube 113 when a section of the signal wave is to be expanded and offset.

The change-over switch 21 comprises three mechanically connected, four-position movable switch or contact arms 76, 77 and 78 cooperating with stationary contacts 79 to 88 inclusive. The contacts 79 and 80 are each of sufficient length to cover two positions of the movable contact 76, but the other stationary contacts are each in contact with their respective switch arms in only one position of the movable contacts. The stationary contacts 81 and 85 are connected to the conductor pair 22 leading from the vertical amplifier 14 for supplying synchronizing voltage to the horizontal sweep generator from the signal, whereas the contacts 82 and 86 are connected to a pair of terminals 89, to which some other source of synchronizing voltage such as an oscillator may be connected. The terminals 83 and 88 are connected to one side of an alternating current source 90, and the terminals 84 and 87 are connected to the other side of the source 90 to form a polarity-changing switch with the movable contacts 77 and 78. It will be observed that the contacts 84 and 88 are connected to the contacts 83 and 87 in reversed sequence. The source 90 is a commercial-frequency low-voltage power source such as the tube-filament-heating winding of a power transformer with a resistor 91 connected across it having the mid-point grounded. Ordinarily the power source 90 or, more exactly, the power source energizing the transformer through which the power is supplied to the unit 31 is the same A. C. source as that energizing the apparatus such as television equipment for example (not shown) in which are produced the voltage waves or signals to be examined in the screen 30 of the oscilloscope 11.

The combination volume-control and phase shifter 31, comprises a condenser 92 connected in series with a potentiometer to the movable contacts 77 and 78. A center-grounded resistor 94 may also be connected thereacross. The potentiometer 93 has a tap 95 connected to the sweep-wave generator input terminal 41 and to the stationary contact 80. The movable contact 76 is connected to the junction 96 of the condenser 92 and the potentiometer 93, and the stationary contact 79 is connected to the movable contact 77. Preferably the potentiometer 93 is circular and the movable contacts of the switch 21 and the potentiometer tap 95 are carried by concentric shafts with concentric control knobs in order to simplify arrangement and operation of control as well as to diminish the lengths of leads.

The change-over switch is so constructed that when its movable contacts 76, 77 and 78 are in the uppermost position, the contacts 76 and 79 are together and close an electrical circuit through conductors 79' and 76' leading to the plates of the condenser 92, thus shorting out the condenser 92. This switch position gives the circuit shown in Fig. 4. In the same position of the switch 21 the contacts 77 and 81 are together and the contacts 78 and 85 are together, thus connecting the ends of the resistor 94 to the synchronizing output conductors 22 leading from the vertical amplifier 14 (Fig. 1). When the movable tap 95 is in substantially the mid position along the resistor 93, its voltage with respect to the grounded mid point of the resistor 94 is substantially zero. Movement of the tap 95 in one direction or the other along the resistor 93 raises or lowers the potential of the tap 95 with respect to ground, or increases the voltage of the tap 95, either positively or negatively according to the direction in which the tap 95 is moved, causing the unit 31 to act as a volume control.

When the movable contacts of the switch 21 are moved to the position adjacent the uppermost position the contacts 76 and 79 are still together and the action of these contacts and the tap 95 is the same as before in correspondence with the simplified circuit of Fig. 4, except that the movable contacts 77 and 78 now make contact with the stationary contacts 82 and 86, respectively, placing the ends of the resistor 94 across the terminals 89, to which an external synchronizing pulse may be applied.

When the switch 21 is moved, either to the lowermost position, or the position adjacent to the lowermost position, the contact 76 no longer makes contact with the stationary contact 79 but instead makes contact with the stationary contact 80. This causes the shunt around the condenser 92 to be removed and causes the tap 95 of the potentiometer 93 to be connected to the upper end 96 of the potentiometer resistor 93 through the conductor 80', the stationary contact 80, the movable contact 76 and the conductor 76', converting the potentiometer 93 into a rheostat. All the circuit elements are shown in Fig. 1. The simplified circuit is illustrated in Fig. 3. With the contacts 77 and 78 in the lowermost position, as illustrated in Fig. 3, the resistor 94 is connected across the power source 90. The circuit may be traced from the upper end 94A of the resistor 94 (Fig. 3) through the movable contact 77, the stationary contact 84 to one terminal 90A of the source 90. The opposite-polarity terminal 90B of the source 90 is connected through the stationary contact 88, and the movable contact 78 to the lower end 94B of the resistor 94. When the switch 21 is moved adjacent to the lowermost position the resistor 94 is connected across the source 90 with the polarity reversed from that for the lowermost position of the switch 21. In this case the movable contact 78 makes contact with the stationary contact 87 and the movable contact 77 makes contact with the stationary contact 83. When the switch 21 is in either of the two lower positions, movement of the tap 95 along the resistor 93 results in more or less of the resistor 93 being shunted out so that the relationship of resistance to capacitance in the series circuit including the unshunted portion of the resistance 93 and the condenser 92 depends upon the position of the tap 95. Thus movement of the tap 95 serves to shift the phase of the voltage at the tap 95.

The horizontal attenuator and calibration comparator assembly 18 comprises a plurality of separate input attenuators 96' for different ratios so constructed that their ratios remain substantially constant irrespective of frequency, a calibration attenuator or voltage divider 97 with the same ratios as the input attenuators, a ratio-changing switch 98 for simultaneously connecting the attenuators of the same ratio with their respective circuits and the selector switch 19 for connecting the horizontal amplifier to one of three different voltage sources. The unit-ratio input attenuator consists merely of a shunt resistor 99 without any taps. The fractional-ratio input attenuators, alike except for ratio, each consist of two series resistor sections 101 and 102, with the ratio of resistance of the section 102 bearing the desired ratio to the entire resistance of both sections, and condensers 103 and 104 across the resistor sections 101 and 102, respectively. The condensers 103 and 104 are selected of such capacities as to overcome the effect of unavoidable circuit capacities and make the capacity ratio equal to the resistance ratio for avoiding wave shape distortion on complex signal waves.

The voltage divider 97 is provided with taps having voltage ratios corresponding to those provided by the input attenuators 96' in order that the same calibration voltage may be supplied to the oscilloscope sweep plates for any ratio setting of the switch 98. For example, the unit ratio position of the attenuator 96' corresponds to the 1/1000 position of the voltage divider 97; the 1/10 position of 96' to the 1/100 position of 97; 1/100 on 96' to 1/10 on 97; 1/1000 on 96' to 1 on 97. The calibration voltage is supplied by an isolating transformer 105 having suitable means for checking and adjusting voltage. For example, the transformer 105 may be energized in the primary side by an ordinary power source such as a 60-cycle line and a potentiometer 105A may be connected to the transformer secondary. The output of the potentiometer 105A is shown connected across the voltage divider 97. Calibration voltage may be measured by an ordinary voltmeter 105B for calibration and is adjusted if necessary by the potentiometer 105A for uniform picture height.

The ratio-changing switch 98 comprises three mechanically connected movable contacts 106, 107 and 108 with a plurality of positions, and stationary contacts for each of the movable contacts in each position. The horizontal input selector switch 19 comprises a three-position, movable contact 109 connected to the movable contact 107, and three stationary contacts SG, E and C, connected respectively to the sweep-wave generator output through the ungrounded conductor of the pair 62, the ungrounded terminal of the pair of external input terminals 17, and the movable contact 106 supplying calibration voltage. The stationary contacts of the ratio-changing switch 98, comprise a left-hand vertical row connected to taps of the calibration voltage divider 97, except for two dead stationary contacts at the upper end of the vertical row, a middle row of vertical contacts connected to the ungrounded ends of the input attenuators 96', and a right-hand vertical row connected to taps of the attenuators 96', except as follows: In the unit ratio or "straight-through" position the middle and right-hand stationary contacts of the switch 98 are both connected to the ungrounded end of the resistor 99. The switch 98 has two "off" positions, one at the lower end 110 grounding the contact 108 and leaving the contact 107 free and one at the upper end 111 grounding both movable contacts 107 and 108, as a "zero ratio" position.

The vertical attenuator and calibrator 23 may be similar to the horizontal attenuator and calibrator 18 in every respect except that an SG position for the selector switch 25 is not needed. The positions E and C, which are provided, serve for passing through an attenuator like 96' to the conductors 26 either a signal voltage from the terminals 24 or a calibration voltage from a calibration input attenuator like the voltage divider 97.

The injector 27 includes a stage of voltage amplification represented by a tube 112 serving as a preamplification stage for the vertical amplifier 14. For the actual injection the injector 27 utilizes an electronic discharge device such as a vacuum tube 113, which is shown by way of example as a pentode. Anode voltage is provided by a source 114 and the signal input is applied through the conductor 26 from the attenuator 23. The tube 112, which may be a type 1852 tube, e. g., has a control grid 116 capacitatively coupled through a condenser 118 and a grid leak 119.

For adjusting the output level between the steps provided by the signal input attenuator 23, vernier gain control is provided in the amplifier. In order to avoid wave shape distortion difficulties, a fixed unbypassed, self-biasing resistor 120A is connected in the cathode lead of the amplifier tube 112, and a fixed negative bias is applied to the grid circuit in addition; the fixed bias being provided by a potentiometer 121' energized by a potential source 121. The vernier gain control is provided by an adjustable resistor 120 shunting the cathode resistor 120A.

For compensating the effect of shunt capacity at the high frequency end of the band a small inductance 122 is connected in the anode lead at the anode end of the coupling resistor 123 of the voltage amplifier tube 112. The voltage amplifier tube 112 is coupled to the remainder of the vertical amplifier by a connection 124.

For avoiding peculiar, very high frequency oscillation, the fixed resistor 120A is connected directly from the cathode of the tube 112 to ground at the tube socket, and a short concentric line, not illustrated, but represented by the conductors 120B and 120C is used to connect the adjustable resistor 120 to the fixed biasing resistor 120A. Since the resistor 120 is not bypassed for ordinary frequencies it produces a degenerative action on the input voltage and vernier voltage control is produced by adjustment of the adjustable resistor 120. This permits moving the control a short distance from the socket. In addition to the inherent shielding of the concentric line shunting the resistors 120 and 120A, the small shunt capacity of the line provides an additional path of low impedance from cathode to ground for the higher parasitic frequencies.

The stage 113 of the injector 27 is provided for offsetting the expanded portion of the wave below the main wave on the screen when sectional expansion is used. For this purpose, the injector tube 113 is arranged to inject a rectangular wave into the cathode resistor of the amplifier stage 112, which is really the first stage of the vertical amplifier. The circuit is so arranged that part of the anode circuit of the injector tube 113 is actually the cathode resistor of the tube 112 in order to avoid any serious effect on the high frequency response or stage gain of this tube. The anode of the tube 113 is coupled to the cathode of the tube 112 by a resistor 125 and a coupling condenser 126. The injector tube 113 also has an adjustable cathode resistor 127 for gain control shunting a fixed self-biasing resistor 127A to which it is connected by conductors 127B and 127C in the form of a short concentric line.

The control grid of the tube 113 is coupled by a coupling condenser 128, series resistor 129, and grid leak 130 to the rectangular wave voltage output of the sweep wave generator assembly 16 coming through the conductor 75 when the switch 34 is set to the point 73. The resistance of the grid leak 130 is made smaller than that of the resistor 129. In order not to sacrifice fidelity of response at the lowest frequencies to be employed, the time constants of the anode coupling circuits in the blanking amplifier and injector are kept at a definite high value by using relatively large resistors and small condensers giving minimum capacity to ground. To this end, the amplifier 33 which is of the pentode type, is designed to operate on a relatively high voltage input signal, "clipping" on both positive as well as negative grid swings and providing a high rectangular output voltage of the order of 50 volts "peak to peak," for example. This permits the blanking coupling circuit to consist of the resistors 129 and 130 on either side of the relatively small condenser 128. For instance the resistors 129 and 130 may have resistances of 300,000 ohms and 15,000 ohms respectively, and the condenser 128 may have a capacity of one-half microfarad.

It will be understood that the vacuum tube circuits include, where not specifically mentioned, suitable anode or impedance coupling resistors, grid-leak resistors, ripple absorbing and by-pass condensers in what is now commonly known as decoupling networks, and the like where necessary or desirable in accordance with well-known practice.

The conductors 22 supplying the voltage for synchronizing the sweep-wave generator with the input signal may be coupled through condensers 131 to a resistance voltage divider 132 connected across a balanced stage of the vertical amplifier 14. Although omitted from the drawing for the sake of simplicity, a power amplifier between the voltage divider 132 and the vertical deflection plates 12 may be desirable.

When it is desired to operate the oscilloscope with the sweep-wave synchronized with the signal, without sectional expansion but with retrace blanking, the selector switch 19 is set at SG, the transfer or change-over switch 21 is set in the uppermost position with the stationary contacts 79, 81 and 85 engaged, and the rectangular-wave selector switch 34 is set to the right-hand position with stationary contact 71 engaged. Furthermore, the selector switch 25 is set at E, and the voltage signal to be examined, is connected to the input terminals 24. In addition, the ratio-changing switches in the attenuators 18 and 23 are moved from the "off" positions to ratio positions giving sufficient voltage for energizing the deflection plates 12 and 13 and producing the desired picture size. The connections produced by the aforesaid position of the switch 21 are shown more simply in the fragmentary diagram of Fig. 4, showing that the condenser 92 is short circuited and causes the potentiometer 93 to function merely as a volume control by which the magnitude of the synchronizing voltage may be adjusted to the proper value and proper polarity in case this is desirable for the tube 35. The frequency adjusting potentiometer 54 is set to the value producing a "free" sweep frequency approximating as nearly as possible the signal frequency and the synchronizing voltage coming through the connection 22 to the grid 43 locks the sweep wave in step with the signal wave.

The tube 39 becomes conducting during the short intervals of the sweep generator operation to discharge the condenser 59 and remains non-conducting during the long intervals. As the condenser is charged during these long intervals directly from the voltage source 42 through the relative high resistance 60, a strong accurately linear triangular sweep voltage wave appears across the condenser 59. This is passed through the conductors 62, the attenuator 18, and the horizontal amplifier 15 to the time axis deflection or sweep plates 13 of the oscilloscope tube 11. The rectangular wave 144 with short negative pulses supplied to the oscilloscope grid 29 by the blanking amplifier 33 through the conductors 68 and 69, biases the osciloscope to cut-off during the quick return sweep if desired so that only the slower forward trace of the beam appears on the screen. Inasmuch as the vertical plates 12 are energized by the signal wave coming through the attenuator 23 and the circuits 27 and 14, the oscilloscope beam is deflected vertically in accordance with instantaneous signal strength and a graphical representation or image of the signal wave appears on the oscilloscope screen.

If a calibration of the horizontal or vertical distances on the oscillograph screen 30 is desired, the input selector switch 19 or 25 of the horizontal or vertical attenuator calibrator is turned to the position "C," and the length of trace in the horizontal or vertical direction on the screen is adjusted to equal that obtained when the input wave was applied to the amplifier in question. The voltage required to produce this was equal to that applied by the input signal to be measured since the amplifier had uniform sensitivity.

If it is desired to expand a portion of the signal wave, the transfer switch 21 is set to one or the other of its lower positions, and the selector switch 34 is set to the point 73. The selector switch 19 is set at SG and the selector switch 25 is set at E. The fragmentary circuit diagram of Fig. 3 then represents the connection of the phase shifter formed by the condenser 92 and the rheostat 93. Varying the position of the tap 95 varies the phase relationship between the voltage source 90 and the voltage applied to the grid 43 by varying the relationship between resistance and capacity in the circuit 92—93. The circuit operation is represented by the series of small graphs below portions of the circuit of Fig. 1 in which various voltage wave forms appear. The phase shifter input is represented by the sine wave 133 and the input to the grid by the sine wave 134. Variations of the phase of the wave 134 varies the instant of energization of the multivibrator tube 36 and thus shifts its output voltage wave 135 in phase.

It will be observed that the wave 135 consists of two steep-sided exponential portions with relative time duration determined by the ratio of grid-leak resistances and of the tubes 36 and 37. The output wave 136 of the tube 37 is reversed in polarity with respect to the wave 135 by virtue of the reversal that ordinarily occurs between input and output voltages in a vacuum tube. The clipper tube 38 cuts off the peak of the short-pulse of the wave 136 to produce an essentially rectangular voltage wave 137. The charging current through the condenser 59 occurs during the long pulse portion of the wave 137 and is essentially constant during this time. Thus the voltage across condenser 59 is a triangular sweep wave 138 with a slowly rising linear portion 139 and a quickly falling return sweep linear portion 140, corresponding in respective pulse length to the short and long pulse lengths of the waves 135, 136 and 137. The normal image 141 of the signal wave (shown sinusoidal for the sake of illustration) is produced on the oscillograph screen 30 during the forward trace of 139 of the sweep wave and a reversed expanded image 142 of a small fraction 143 of the signal wave is produced during the quick return portion 140 of the sweep wave. The rectangular wave 144 injected into the vertical amplifier circuit offsets the curves 141 and 142 from each other for clarity. Any desired portion of the wave may be selected for expansion by adjusting the phase shifting tap 95 to cover approximately 180° of shift or reversing the polarity of the synchronizing voltage 90 by means of the switch blades 77 and 78 shown simplified inu Fig. 3, to approximately cover the remaining 180° of shift.

Referring to Fig. 1 it will be observed that the input signal applied to the input terminals 24 is passed through the attenuator 23 and reappears as a signal across the output conductors 26, the amplitude of the signal depending upon the setting of the selector switch 25 within the attenuator 23. The signal appearing between the conductors 26 is applied to the control grid 116 of the voltage amplifier tube 112 and reappears in amplified form between the conductor 124 and ground serving as the input connections to the vertical amplifier 14. After passing through the vertical amplifier 14 the signal appears on the vertical deflection plates 12 of the oscilloscope 11. If the selector switch 34 has been set in the position contacting the stationary contact 73 a short-negative-pulse rectangular wave from the tube 63 is applied to the control electrode of the injector tube 113. This rectangular pulse is amplified by the tube 113 and injected in the cathode circuit of the voltage amplifier tube 112 by being applied to the cathode resistor 120A. This causes a rectangular pulse to be superimposed on the discharge current of the tube 112 and therefore upon its output voltage. Since this rectangular pulse occurs only during the expanded portion of the signal wave produced by the high-sweep-speed portion of the sweep wave, the resultant voltage output of the voltage amplifier tube 112 consists of the signal wave with one portion thereof to be expanded offset from the remainder of the wave. This resultant wave including the offset portion is of course amplified by the vertical amplifier 14 and caused to appear on the vertical deflection plates 12 of the oscilloscope 11.

Under ordinary circumstances, i.e., utilizing the voltage source 90 for synchronization of the sweep wave generator, the selector switch 19 is set to the position shown in Figs. 1 and 2; the changeover switch 21 is set to either of the alternative positions represented by the simplified diagram of Fig. 3, and the selector switch 34 is set to the left-hand position with contact made to the contact 72. The voltage wave of the power source 90, which is assumed to be also the power source energizing apparatus to be analyzed by means of the oscilloscope 11, is applied across the resistor 94. Since the apparatus to be analyzed is energized by the same original power source as that supplying the voltage source 90, any voltages appearing in the apparatus to be examined will ordinarily be harmonics or subharmonics of the fundamental frequency of the voltage source 90, the wave form of which is represented by the curve 133. A curve of similar wave form but displaced therefrom in phase appears on the potentiometer tap 95 which is connected to the control grid 43 of the buffer or isolating amplifier tube 35. The phase relationship between the curve 134 and curve 133 may be varied by adjustment of the potentiometer tap 95. The zero crossover point of the curve 134 which is applied to the control grid of the multivibrator tube 36 determines the instant when the multi-vibrator comprising the tubes 36 and 37 shifts from one tube-conduction condition to the other. Thus, the output curves 135 and 136 of the multi-vibrator tubes 36 and 37, respectively, are synchronized with the curve 134. If the values of the condensers 47 and 48 are selected and the "free" frequency resistor adjustment tap 55 of the multi-vibrator is set to provide a free frequency substantially the same as that of the curve 134, the curves 135 and 136 will have the same frequency as the curve 134 and the phase relationship thereof with respect to curve 133 may be adjusted by means of the tap 95. Similarly, if the free frequency adjusting tap 55 is set for any other free frequency which is approximately a harmonic of that of the curve 134, the multi-vibrator will be pulled into synchronism with the curve 134 producing waves 135 and 136 which are harmonics of the frequency of the wave 134. The manner in which a multi-vibrator tends to synchronize with a voltage applied to one of its control electrodes and may be used for producing an output wave which either has the same frequency or some harmonic of the frequency of the synchronizing wave, according to the constants of the multi-vibrator, is known to those skilled in the art and is not a part of my present invention. I have found that the connection of the grids of the tubes 36 and 37 through their gridleaks 52 and 53 provides smooth adjustment in control of the natural frequency of the multi-vibrator.

As previously described more in detail the output wave 136 of the multi-vibrator tube 37 is clipped by the tube 38 to produce the rectangular wave 137 which has a rectangular short pulse and substantially rectangular long pulse, and this wave is converted by the tube 39 and the resistor condenser circuit 60—59 into the triangular wave 138 appearing across the condenser 59. The long relatively slow sweep or forward trace portion 139 of the wave 138 spreads the beam of the oscilloscope 11 out horizontally along the time axis in order to form the main portion of the signal wave 141 on the screen 30 of the oscilloscope 11. The reversely moving short high speed retrace portion 140 of the sweep wave 138 causes the beam of the oscilloscope 11 to be swept back rapidly across the screen 30 in a horizontal direction in order to cause the portion 143 of the signal wave to be spread out or expanded to form the expanded section 142 on the screen 30 of the oscilloscope 11. This portion 142 is offset as previously explained by the action of the injector tube 113.

Although the sweep wave voltage 138 which appears across the condenser 59 may be applied directly to the horizontal amplifier 15, it is shown as being passed through the conductors 62 to the stationary terminal SG of the selector switch 19 of the attenuator 18, from which the voltage passes through conductor 20 to the horizontal amplifier 15 in which it is amplified and applied to the horizontal sweep plates of the oscilloscope 11.

The use of the sine-wave source 90 for synchronizing voltage permits the use of a simple form of phase shifter when sectional wave expansion is desired and eliminates difficulties which might be encountered. The arrangement is used as a simplification of a more elaborate method whereby complex waves of any fundamental frequency could be expanded. Some of these methods have been made the subject of co-pending applications. In certain examples, the fundamental frequency of the input signal is recovered and used with the above method of shifting phase. Such complication is not always warranted especially when the oscilloscope is to be used to adjust television equipment, inasmuch as the more important television waves requiring expansion will be found to be either harmonics or subharmonics of the A. C. power source serving as the original source of energy for both the television equipment to be examined and the apparatus illustrated in the present application. The wave to be examined will in nearly all cases either be synchronous with the power frequency voltage source 90 or will be one that may be synchronized therewith. Under such circumstances it is most convenient to use the voltage source 90 for synchronization. When no sectional wave expansion is desired, not only the source 90, but also the synchronizing voltage 22 from the signal wave or an external synchronizing voltage 89 is available for synchronizing the sweep wave.

When it is desired to examine signal voltages in the oscilloscope 11 which are not related as harmonics or sub-harmonics and which therefore have no synchronous relationship to a power source which can be used to energize the oscilloscope, a separate synchronizing voltage is employed instead of the voltage source 90. Under such circumstances it may be necessary to utilize a separate source of synchronizing pulses if the wave form of the output amplifier 14 is so irregular or of such a character as to be unsatisfactory for synchronizing purposes. For example, synchronizing pulses, utilized both for synchronizing the apparatus producing the signal to be examined in the oscilloscope and for synchronizing the sweep wave generator 32, may be applied to appropriate terminals of the apparatus illustrated in the present application. Such synchronizing pulses (source not shown) may be applied to the terminals 89 if the change-over switch 21 is placed in the position adjacent the uppermost position in which the contacts 77 and 78 are connected to the contacts 82 and 86, respectively.

If for any reason it is desired to use an entirely independent sweep wave, for example, for checking the results obtained with the sweep wave generator 32, an externally produced sweep wave from apparatus (not shown) may be applied to the terminals 17 in which case the movable contact 109 of the selector switch 19 is moved to the position E for an external sweep wave.

From the foregoing explanation it will be observed that the selector switch 19 of the attenuator calibrator 18 has three positions, the position SG to be used when the oscilloscope 11 is to receive its sweep wave from the sweep wave generator 32, the position E when an external sweep wave is to be applied to the horizontal plates 13 and the position C for calibration of either the internal or external sweep wave. Calibration is effected by comparison of the horizontal deflection of the beam produced by such sweep waves with the horizontal deflection of beam produced by a standard voltage measured by the voltmeter 105B and attenuated in a predetermined ratio by the attenuators in the unit 18.

The switch 25 in the vertical attenuator calibrator 23 serves a similar purpose except that there are only two positions, one position marked E for passing the signal through the apparatus 23 to the vertical deflection plates 12 of the oscilloscope 11 and the other marked C for passing a fixed voltage through the apparatus 23 which produces a predetermined vertical deflection of the beam and thus provides a means of calibrating the vertical coordinates of the curve produced on the screen 30 when the signal wave is applied to the vertical deflection plates 12.

The change-over switch 21 has four positions. The uppermost position is for causing the sweep wave generator 32 to be synchronized by a voltage tapped off the output of the vertical amplifier and thus synchronized directly with the signal wave. The position adjacent the uppermost position provides for synchronizing with pulses applied to the terminals 89. The next lower position provides for synchronization from the power source 90 which is a fundamental of the frequencies produced in apparatus to be examined in the oscilloscope 11. The lowermost position of the switch 21 is the same as the position adjacent the lowermost position except that the sweep wave is displaced 180 degrees from that produced when the switch is in its next to the lowermost position.

The switch 34 is moved to the left-hand position making contact with the stationary contact 73 when the rectangular wave 144 is to be injected into the vertical amplifier 14 through the injector tube 113 for offsetting an expanded portion of the wave. The switch 34 is moved to the mid position on stationary contact 72 when it is desired for any purpose to produce a rectangular wave which may be taken off at the output terminals 74. The switch 34 is moved to the right-hand position on the contact 71 when wave expansion is not desired but it is desired to blank out the retrace of the sweep wave.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A wave-examining system for studying oscillatory phenomena occurring in synchronous relation to a commercial power source frequency, said system comprising an oscilloscope with a screen and means for deflecting a wave tracer along two different axes, means for producing deflection along one axis in accordance with instantaneous values of signal strength, a sweep wave generator producing a saw-tooth slow-forward, quick-return-sweep wave for causing deflection along the second axis of the oscilloscope, said generator having an input terminal for receiving synchronizing voltage, a commercial-frequency A. C. power source, a phase-shifter energized by said source and having an output terminal connected to said sweep wave generator synchronizing terminal to supply adjustable-phase synchronizing voltage, whereby an expansion of a section of the signal wave is produced on the oscilloscope screen by the quick return sweep of the saw-tooth wave and the section expanded may be selected by adjustment of the phase-shifter.

2. In a wave examining system arranged for sectional wave expansion, an arrangement for offsetting a portion of the wave to be examined in expanded form, said wave examining system comprising an oscilloscope with a screen, and means for deflecting a wave tracer along two different axes, means for producing deflection along one axis in accordance with instantaneous values of signal strength, a sweep wave generator producing a slow-forward quick-return sweep saw-tooth wave for causing deflection along the second axis of the oscilloscope, and a signal input terminal arranged for application thereto of a signal voltage to be examined in the oscilloscope, said offsetting arrangement comprising in combination with said signal wave input terminal, a signal wave amplifier of the vacuum tube type having a cathode resistor in one of its stages, said amplifier being arranged for connection on the input side to said signal wave input terminal and on the output side to said signal axis deflection producing means, means for generating a rectangular wave having wave offsetting pulses of the same length as the quick return sweep portion of the sweep wave generator in the system with which the offsetting arrangement is to be used, means for synchronizing said rectangular wave with the quick return portion of the sweep wave, and means for feeding such rectangular wave into the said cathode resistor for offsetting the portion of the signal wave to be examined.

3. In a sweep wave generator for a wave-examining oscilloscope system, a unit comprising an output or synchronizing terminal for applying synchronizing voltage to a sweep-wave generator, a three-pole transfer switch with two positions and three movable contacts, a resistor having an adjustable tap and a condenser connected in series with two of said transfer-switch movable contacts, the common terminal of said condenser and resistor being connected to the remaining movable switch contact, a stationary contact cooperating with said last mentioned movable switch contact in a first position and connected to the free side of the condenser, a second stationary contact cooperating with said movable contact in a second position and connected to the resistor tap, a second pair of stationary contacts for connection to a source of synchronizing potential and cooperating with the first two movable contacts in one position and a third pair of stationary contacts for connection to a commercial frequency A. C. power source and cooperating with said first two movable contacts in a second position whereby in the first switch position the condenser is short-circuited and the resistor tap serves as a volume control for synchronizing voltage which may be applied to the second pair of stationary contacts and in the second switch position the portion of the resistor lying between the end and the tap is short circuited and the adjustable resistor tap serves as a phase shifter for shifting the phase relationship between an A. C. power source which may be applied to the third pair of stationary contacts and voltage appearing at the unit output terminal for synchronizing sweep wave generator.

4. An arrangement such as set forth in claim 3 with an additional or third movable contact position and an additional or fourth pair of stationary contacts cooperating with the first two movable contacts in the third position and being connected in reversed sequence to the third pair of stationary contacts in order to form a polarity reverser for an A. C. power source connected to the third pair of stationary contacts to extend the phase shift range thereof from 180 to 360 degrees.

5. In combination an oscilloscope having a wave tracer arranged to be deflected along transverse axes, means for producing deflection along one axis in accordance with instantaneous values of signal strength, a sweep wave generator producing a saw-tooth wave for causing deflection along the second axis of the oscilloscope, and adjustable ratio calibration attenuation means interposed between a source of input signal to be examined and the signal deflection producing means and between said sweep wave generator and said sweep deflection producing means, said calibration attenuation means including a plurality of high frequency attenuators of different ratios, a selector switch, a calibration voltage source with a voltage divider having ratios corresponding to the high frequency attenuator ratios, said correspondence being such that an amplifier connected thereto may always receive the full input voltage when the full calibrating source voltage is applied to the calibrating voltage divider regardless of high frequency attenuator step employed, and a ratio changing switch for simultaneously connecting corresponding high frequency attenuators and voltage dividers to the transfer switch, whereby the selector switch may be utilized to cause either an input signal wave or calibration voltage to produce the oscilloscope deflections.

6. In an oscilloscope system arranged for sectional expansion of a signal wave to be examined, a sweep wave generator for producing a saw tooth sweep wave and a corresponding rectangular wave of relatively large amplitude, a signal amplifier and a vacuum tube stage for injecting the rectangular wave into the signal amplifier to offset the section of the wave to be expanded, said injector stage being coupled to the rectangular wave output of the sweep wave generator by a pair of resistors having a relatively small condenser interposed between them in series, one of said resistors being relatively small and constituting the grid leak of the said injector tube, whereby the time constant of the coupling circuit is kept sufficiently large and the capacitance to ground is kept sufficiently small to avoid distortion of the rectangular wave by suppression of high frequency components or weakening of low frequency response and the gain of the injector is kept sufficiently large to produce adequate off-setting of the expanded portion of the wave.

7. In a sweep wave generator for producing sweep waves over a wide range of frequencies from below the audible range into the radio frequency range, the combination of a synchronizing amplifier, a pair of vacuum tubes connected as a multivibrator, and means for amplifying the output of the multivibrator and a variable source of positive potential, said multivibrator tubes having anodes and control grids cross-coupled by relatively low capacity condensers, the grid circuit of one of the multivibrator tubes being coupled to the output side of the synchronizing amplifier, each grid being connected to said source of variable potential in series with a grid resistor, whereby smooth adjustment of frequency is obtained by variation of said potential.

8. In a sweep wave generator a rectangular-wave-producing circuit comprising a pair of multivibrator tubes and a clipper tube, the multivibrator tubes being electronic discharge devices with anodes and control grids capacitively cross-coupled, said clipper tube being an electronic discharge device having a control grid coupled to the anode of the second stage multivibrator tube, the constants of the circuits being so chosen that the control grid of the second stage tube of the multivibrator is driven past cut-off during the negative voltage swing of the anode of the first stage multivibrator tube, whereby one loop of the current wave in the second multivibrator stage is clipped or made rectangular, and the characteristics of the clipper tube being such that its grid is driven past negative cut-off during the negative voltage pulses of the anode of the second stage multivibrator tube.

9. In a sweep wave generator for producing sweep waves over a range of frequencies, a pair of electronic discharge devices, each having an anode, a cathode, and a control grid, a pair of condensers, each connected between the anode of one electronic discharge device and the control grid of the other to form a multivibrator circuit, a pair of grid-leak resistors connected in series between said grids, resistors connected in the cathode leads of the electronic discharge devices to limit the peak currents drawn thereby, a potentiometer, a source of unidirectional voltage applied to said potentiometer, said cathode resistors and said potentiometer all being grounded together at one end, said potentiometer having a tap adjustable thereon and connected to the common point of said grid-leak resistors for varying the grid bias of said electronic discharge devices and for varying the frequency of oscillation of the multivibrator circuit, said cathode resistors being relatively small in resistance value compared with said potentiometer to avoid depressing frequency before it is again smoothly increased as a smoothly increasing positive potential is applied to the grid-leak resistors by adjustment of the position of the said tap of the potentiometer.

10. In a sweep wave generator for producing sweep waves over a wide range of frequencies from below the audible range into the radio frequency range, the combination of a synchronizing amplifier, a pair of low-amplification-constant vacuum tubes connected as a multivibrator, said multivibrator tubes having anodes and control grids cross-coupled by relatively low capacity condensers, a pair of gridleak resistors, each connected to one of said control grids, and a variable source of positive potential connected to said control grids in series with said gridleak resistors for smooth adjustment of frequency of the multivibrator circuit, the output of the synchronizing amplifier being fed to the multivibrator circuit for synchronizing it with the input signal.

11. In a sweep wave generator a rectangular wave-producing circuit comprising a pair of multivibrator tubes and a clipper tube, the multivibrator tubes being electronic discharge devices having anodes and control grids capacitively cross-coupled to form a multivibrator, the constants of the circuits being so chosen that the control grid of the second stage tube of the multivibrator is driven past cut-off during the negative voltage swing of the anode of the first stage multivibrator tube, whereby one loop of the current wave in the second multivibrator tube is clipped or made rectangular, said clipper tube being an electronic discharge device having a control grid so coupled to the circuit of the multivibrator as to be driven negative during the other or unclipped loop of the current wave in the second multivibrator tube, the circuit constants and the characteristics of the clipper tube being such that its grid is driven past negative cut-off.

12. In a sweep wave generator for a wave examining oscilloscope system, a terminal and a ground connection for applying synchronizing voltage to the sweep wave generator, a pair of terminals between which a synchronizing potential may be applied, a resistor connected between said last-mentioned pair of terminals, having its midpoint grounded and having a movable tap thereon, said tap being connected to said first-mentioned terminal, whereby the synchronizing voltage applied to the sweep wave generator is continuously adjustable in both amplitude and polarity.

13. In a sweep wave generator for producing sweep waves, a pair of electronic discharge devices each having an anode, a cathode, and a control grid, a pair of condensers each connected between the anode of one electronic discharge device and the control grid of the other to form a multivibrator circuit, and resistors connected in the cathode leads of the electronic discharge devices to limit the peak currents drawn thereby without preventing the flow of normal tube current.

14. In a sweep wave generator, a pair of electronic discharge devices each having an anode, a cathode, and a control grid, a pair of condensers each connected between the anode of one electronic discharge device and the control grid of the other to form a multivibrator circuit, a pair of grid leak resistors each connected in the grid-cathode circuit of one of said electronic discharge devices, a synchronizing amplifier, and a connection between the output thereof and a point near the low potential end of one of said grid leak resistors for synchronizing the multivibrator circuit without influencing the frequency thereof.

15. In a sweep wave generator, a pair of electronic discharge devices each having an anode, a cathode, and a control grid, a pair of condensers each connected between the anode of one electronic discharge device and the control grid of the other to form a multivibrator circuit, a pair of grid leak resistors each connected in the grid-cathode circuit of one of said electronic discharge devices, and means for applying a synchronizing potential to a point in one of said grid leak resistors near the low potential end thereof for synchronizing the multivibrator circuit without influencing the frequency thereof.

16. In a variable frequency sweep wave generator, a pair of vacuum tubes of low amplification constant, having anodes, cathodes and control grids, condensers cross-coupled between the anodes and control grids of the tubes to form a multivibrator circuit, grid leak resistors in the control grid-cathode circuit of each of the tubes, the relationships between the resistance values of the grid leak resistors and the capacity values of the coupling condensers being so selected as to provide a wide range of natural frequencies, the low amplification constants of the tubes serving to minimize the effective capacitances thereof to preserve the steepness of the output wave at the points of current shift between tubes for producing high quality rectangular waves.

ELLSWORTH D. COOK.